United States Patent
Hintenlang et al.

[11] Patent Number: 5,964,466
[45] Date of Patent: Oct. 12, 1999

[54] SEALING DEVICE

[75] Inventors: Armin Hintenlang, Hirschberg; Klaus Schäfer, Mannheim-Rheinau; Reinhold Kraus, Mörlenbach; Kurt Ewald, Frankenthal; Andreas Jaekel, Weinheim; Rolf Weis, Hemsbach; Erwin Schäfer, Viernheim; Bernd Stichler, Ludwigsburg, all of Germany

[73] Assignee: Firma Carl Freudenberg, Weinheim, Germany

[21] Appl. No.: 08/929,754

[22] Filed: Sep. 15, 1997

[30] Foreign Application Priority Data

Sep. 17, 1996 [DE] Germany ............... 196 37 813

[51] Int. Cl.⁶ ................................. F16J 15/38
[52] U.S. Cl. ................. 277/371; 277/390; 277/391
[58] Field of Search .................... 277/358, 370, 277/371, 375, 390, 391

[56] References Cited

U.S. PATENT DOCUMENTS

| | | | |
|---|---|---|---|
| 2,347,118 | 4/1944 | Matter | 277/391 |
| 2,598,886 | 6/1952 | Brummer | 277/391 |
| 2,722,439 | 11/1955 | Brummer et al. | 277/391 |
| 2,888,280 | 5/1959 | Meyer et al. | 277/391 |
| 3,291,493 | 12/1966 | Blair | 277/391 |
| 4,272,084 | 6/1981 | Martinson et al. | 277/390 |
| 4,558,872 | 12/1985 | Vossieck et al. | 277/391 |
| 4,854,598 | 8/1989 | Deuring | 277/391 |
| 5,199,719 | 4/1993 | Heinrich et al. | |

FOREIGN PATENT DOCUMENTS 39 27 589 A1  3/1991  Germany .

*Primary Examiner*—Anthony Knight
*Assistant Examiner*—John L. Beres
*Attorney, Agent, or Firm*—Kenyon & Kenyon

[57] ABSTRACT

A sealing device comprises a slide ring having a sliding surface and a counterring affixed to a shaft, the sliding surface of the slide ring sealingly contacting the counterring and capable of rotating relative to the counterring, the slide ring, on a side facing away from the sliding surface, being sealed relative to a retaining ring by a sealing element of elastomeric material, the retaining ring being biased by a compression spring away from a housing which has an essentially C-shaped cross-section open in the direction of the slide ring. The sealing element is constructed as a ring-shaped bellows and has an essentially N-shaped cross-section with a first radial segment and a second radial segment which are connected by an axial segment. The first radial segment sealingly contacts an end face of the slide ring facing away from the sliding surface, and the second radial segment sealingly contacts an inner segment of the housing.

6 Claims, 1 Drawing Sheet

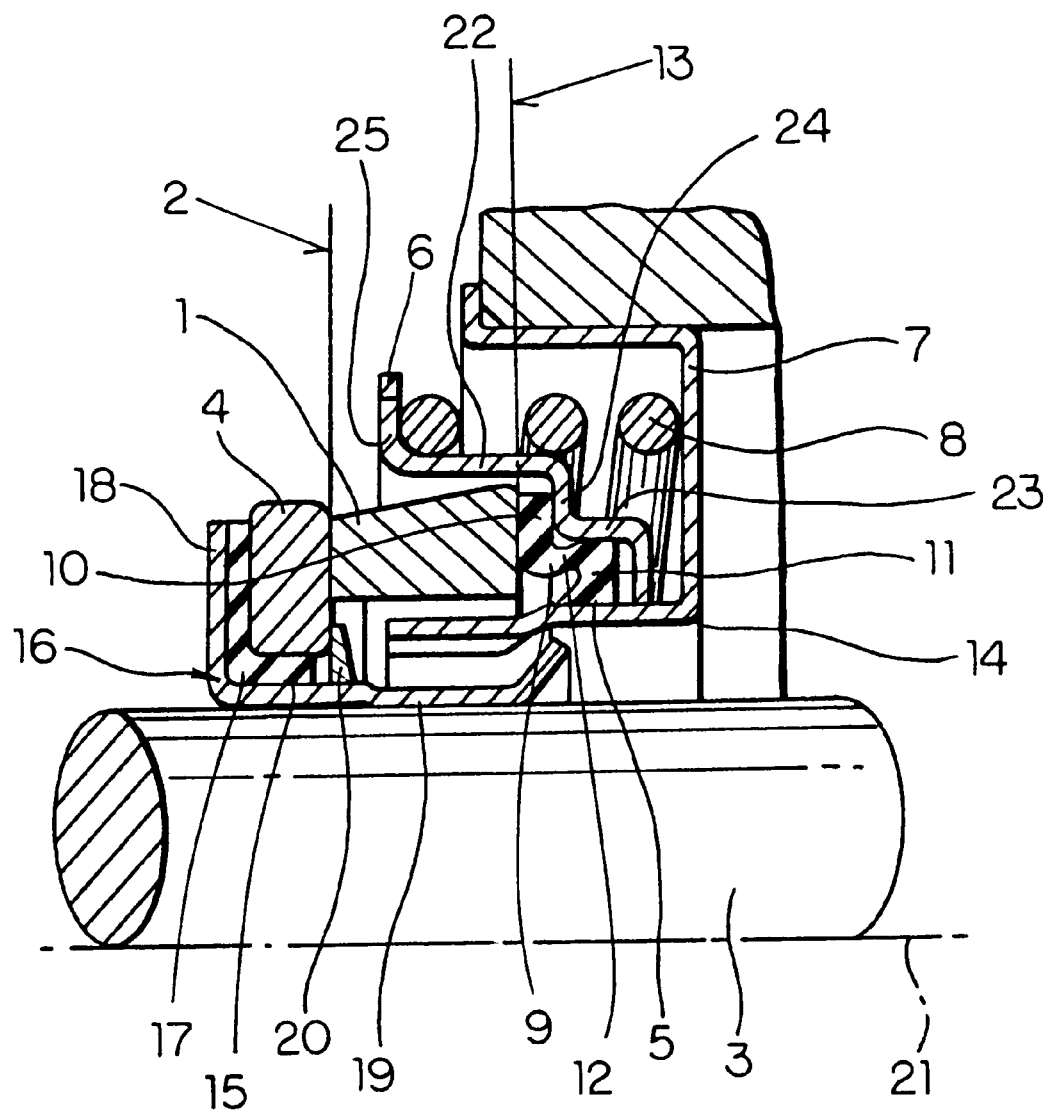

SEALING DEVICE

BACKGROUND OF THE INVENTION

The invention relates to a sealing device comprising a slide ring elastically prestressed against a counterring for sealing, the slide ring and counterring having sliding surfaces allowing relative rotation between the two. The counterring is relatively immovably affixed to a shaft. The slide ring, on the side facing away from its sliding surface, is sealed relative to a retaining ring by a sealing element of elastomeric material. The retaining ring is biased by a compression spring away from a housing which has an essentially C-shaped cross-section open in the direction of the slide ring.

Such a sealing device is known from German Patent Document 39 27 589 and U.S. Pat. No. 5,199,719. The sealing element overlaps a large part of the slide ring in the axial direction and is pressed, under prestressing, against the slide ring by a first retaining ring which forms a first abutment for the compression spring. The sealing element has a shape adapted to the shape of the housing, with an essentially C-shaped cross-section that is open axially in the direction of the slide ring. As a second abutment for the compression spring, a second retaining ring is provided within the sealing element. Because of the design and the arrangement of the sealing element within the housing, the axial dimension of this previously known sealing device is comparatively large. In particular for applications where the axial length of the installation space is very short, this previously known sealing device is not very satisfactory.

SUMMARY OF THE INVENTION

An object of the invention is to develop a sealing device having a reduced axial length, comprising fewer parts, and being capable of being produced simply and cost-effectively.

In accordance with an embodiment of the invention, the sealing device has a sealing element constructed as a ring-shaped bellows having an essentially N-shaped cross-section with first and second radial segments connected by an axial segment. The first radial segment sealingly contacts the end face of the slide ring that faces away from the sliding surface contacting the counterring. The second radial segment sealingly contacts an inner segment of the housing. Because the cross-section of the ring-shaped bellows is essentially N-shaped, the entire sealing device is very short in the axial direction. Given shaft diameters of around 10 mm, the axial length of the sealing device in the unmounted state corresponds approximately to the diameter of the shaft. The sealing of the medium to be sealed takes place between the first radial segment and the end face of the slide ring facing away from the sliding surface contacting the counterring and between second radial segment and the inner segment of the housing. The first radial segment is axially prestressed against the slide ring by the action of the compression spring on the retaining ring. The second radial segment is radially prestressed against the housing due to the elasticity of the bellows material itself.

The profile of the retaining ring is adapted to the shape of the bellows. To accommodate the compression spring in the sealing device with reduced space requirements, the retaining ring at least partially overlaps the slide ring in the axial direction and, on the side facing the counterring, is provided with a flange directed radially outwardly for the support of the compression spring. The retaining ring forces both the first radial segment in the axial direction against the slide ring and the second radial segment in the radial direction, under elastic prestressing, against the periphery of the inner segment of the housing.

The retaining ring and the bellows can be permanently joined. For example, the retaining ring and the bellows may be vulcanized together. This advantageously simplifies the assembly of the sealing device, because the retaining ring and the bellows are constructed as a unit which can be preassembled.

The first radial segment, axially on the side facing away from the slide ring, is in contact, under elastic prestressing, with the retaining ring, avoiding a relative movement that would be encumbered by friction.

The second radial segment is in contact radially on the inner side with the inner segment of the housing, and radially on the outer side with the retaining ring, in each case avoiding a relative movement that would be encumbered by friction. The N-shaped bellows exhibits excellent working properties during the service life of the sealing device. In the event of axial shifts of the slide ring relative to the housing caused, for example, by thermal expansion, a roll-away movement takes place between the outer peripheral side of the second radial segment and the area of the retaining ring that is in contact, under elastic prestressing, with the second radial segment. In this manner, abrasive wear and tear is avoided in this area. The bellows is merely subject to a flexing strain that does not disadvantageously affect its service life.

The retaining ring and the housing are made of a tough, rustproof material. Preferably metallic materials are used since, given small dimensions, they exhibit great stability, and manifestations of relaxation, which lead to an unwanted change in the working properties of the sealing device, are reliably avoided.

BRIEF DESCRIPTION OF THE DRAWING

The drawing shows an embodiment of a sealing device in accordance with the invention.

DETAILED DESCRIPTION OF THE DRAWING

The drawing shows an enlarged view of an exemplary embodiment of a sealing device according to the invention. Counterring 4 surrounds an engaging ring 15 that is essentially L-shaped and is pressed onto the periphery of shaft 3. Engaging ring 15 is surrounded by counterring 4 with radial clearance between the two. A sealing ring 17 of elastomeric material is arranged in the gap 16 formed by the clearance. In this exemplary embodiment, the sealing ring 17 has an L-shaped cross-section and is arranged, under axial prestressing, between radial segment 18 of the engaging ring 15 and the end face of counterring 4 that faces away from the slide ring 1. Arranged on axial segment 19 of the engaging ring 15 is a thrust ring 20 which is formed as a cup spring and which is in contact with the end face of the counterring 4 that faces the slide ring 1. The engaging ring 15, the sealing ring 17, the counterring 4 and the thrust ring 20 form a unit which can be preassembled. These parts are also undetachably joined together in the non-assembled state of the sealing device. Because of this, the assembly of the sealing device is substantially simplified.

Engaging ring 15 a nd thrust ring 20 are made of a stainless steel, while counterring 4 is made preferably of a ceramic material and, because of this, exhibits virtually no wear and tear during the service life of the sealing device.

The unit comprising engaging ring 15, sealing ring 17, counterring 4, and thrust ring 20, moves together with the shaft 3 around axis of rotation 21 during the normal utilization of the sealing device.

Slide ring 1 is in contact, under elastic prestressing, with the end face of counterring 4 that faces it. The elastic prestressing is produced by compression spring 8 which is axially supported on the one side in housing 7 and on the other side against retaining ring 6. The spring tension is transferred from retaining ring 6 onto sealing element 5, which is constructed as an N-shaped bellows 9, and from bellows 9 directly onto the end face of slide ring 1 facing opposite its sliding surface 2.

As can be seen in the drawing, the retaining ring 6 comprises a first axial segment 22 and a second axial segment 23 which are connected by a first radial segment 24. The retaining ring 6 also comprises a radially extending flange 25 extending from the first axial segment 22. The compression spring 8 that biases the retaining ring 6 away from the housing 7 presses against the radially extending flange 25 of the retaining ring 6.

Bellows 9 has a first radial segment 10 and a second radial segment 11 which are connected by an axial segment 12. First radial segment 10 is arranged, under axial prestressing, between the first radial segment 24 of the retaining ring 6 and the end face of slide ring 1 facing the retaining ring 6. Second radial segment 11 is arranged, under radial prestressing, between the second axial segment 23 of the retaining ring 6 and the inner segment 14 of the housing 7.

Due to the design and arrangement of retaining ring 6 and bellows 9, the entire sealing device has extremely small dimensions in the axial direction. In the exemplary embodiment shown here, both the diameter of the shaft and the axial length of the sealing device amount to about 12 mm.

In the event of axial shifts of the shaft 3 relative to the housing 7, the bellows 9 must follow the shift. In so doing, the contact surface between the periphery of second radial segment 11 and the retaining ring 6 is not subject to any abrasive wear and tear. The second radial segment 11 of bellows 9 rolls away on the inner circumferential surface of the retaining ring 6. In this manner, relative movements encumbered by friction, which impair the working properties, are avoided.

What is claimed is:

1. A sealing device comprising a slide ring having a sliding surface and a counterring affixed to a shaft, the sliding surface of the slide ring sealingly contacting the counterring and capable of rotating relative to the counterring, the slide ring, on a side facing away from the sliding surface, being sealed relative to a retaining ring by a sealing element of elastomeric material, the retaining ring being biased by a compression spring away from a housing which has an essentially C-shaped cross-section open in the direction of the slide ring, wherein the retaining ring comprises a first axial segment and a second axial segment which are connected by a first radial segment and the retaining ring further comprises a radially extending flange extending from the first axial segment wherein the compression spring that biases the retaining ring away from the housing presses against the radially extending flange of the retaining ring, wherein the sealing element is constructed as a ring-shaped bellows and has an essentially N-shaped cross-section with a first radial segment and a second radial segment which are connected by an axial segment, and wherein the first radial segment of the sealing element is positioned between the first radial segment of the retaining ring and an end face of the slide ring facing away from the sliding surface and the first radial segment of the sealing element sealingly contacts the end face of the slide ring facing away from the sliding surface, and the second radial segment of the sealing element is positioned between the second axial segment of the retaining ring and an inner segment of the housing and the second radial segment of the sealing element sealingly contacts the inner segment of the housing.

2. A sealing device as defined in claim 1, wherein a profile of the retaining ring is adapted to the shape of the bellows.

3. A sealing device as defined in claim 1, wherein the retaining ring and bellows are permanently joined.

4. A sealing device as defined in claim 1, wherein the first radial segment, axially on the side facing away from the slide ring, is in contact, under elastic prestressing, with the retaining ring, avoiding a relative movement encumbered by friction.

5. A sealing device as defined in claim 1, wherein the second radial segment is in contact radially on the inside with the inner segment of the housing and radially on the outside with the retaining ring, in each case while avoiding a relative movement encumbered by friction.

6. A sealing device as defined in claim 1, wherein the retaining ring and housing are made of a tough, rustproof material.

* * * * *